April 25, 1950 W. E. GLOOR 2,505,039
CELLULOSE DERIVATIVE PLASTIC COMPOSITION
Filed April 5, 1947
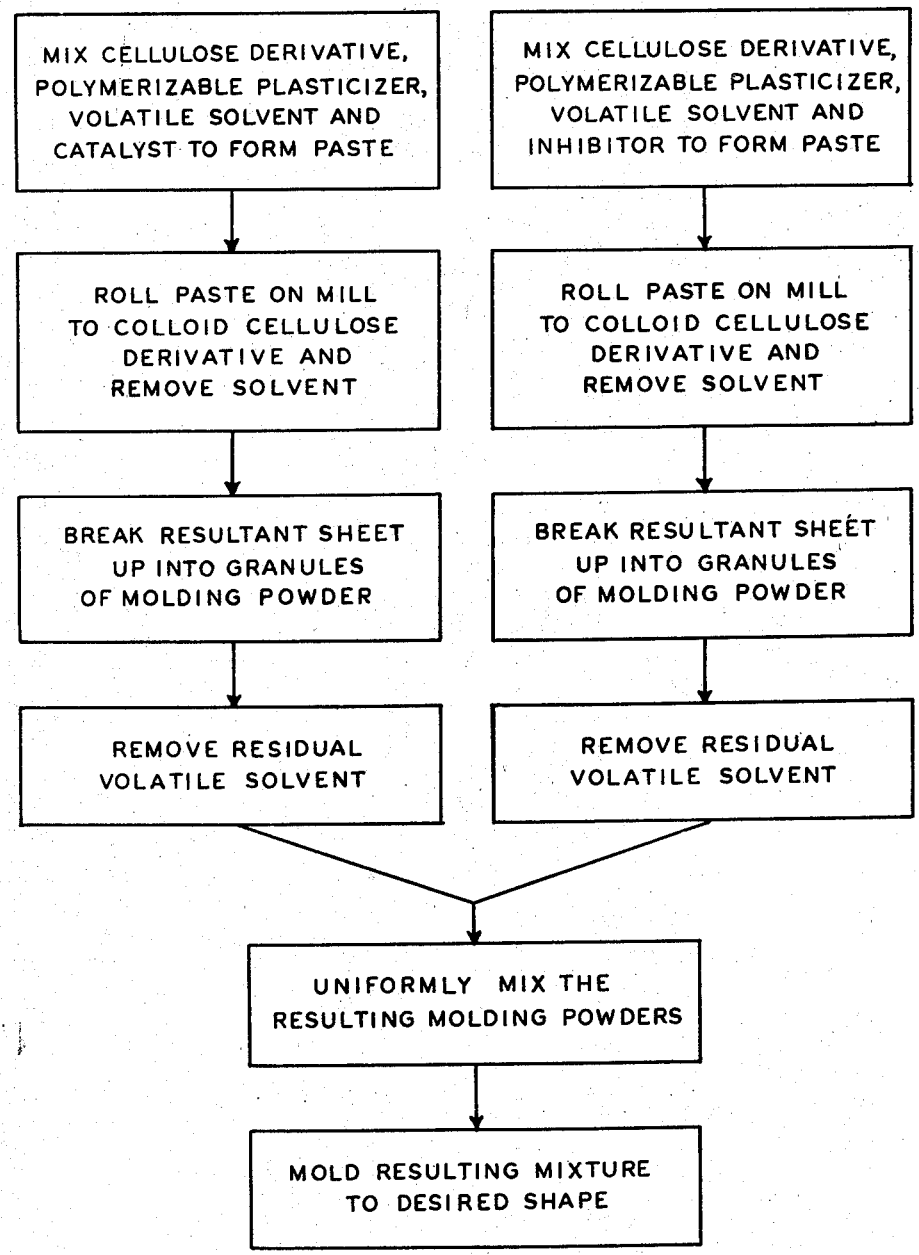
WALTER E. GLOOR
INVENTOR.
BY Ernest G. Peterson
AGENT Patented Apr. 25, 1950

2,505,039

UNITED STATES PATENT OFFICE 2,505,039

CELLULOSE DERIVATIVE PLASTIC COMPOSITION

Walter E. Gloor, New Brunswick, N. J., assignor to Hercules Powder Company, Wilmington, Del., a corporation of Delaware Application April 5, 1947, Serial No. 739,642

14 Claims. (Cl. 260—17)

This invention relates to compositions of matter comprising derivatives of cellulose and methods for their production; more particularly it relates to plastic compositions comprising a cellulose derivative and a polymerizable plasticizer of the type containing at least two nonconjugated double bonds.

Compounds having at least two nonconjugated double bonds, of which diallyl phthalate is exemplary, have been known to have a high solvent power for cellulose derivatives and the possibility of their use in the plastics art has been recognized. However, in this application they do not function as do the normal plasticizers for cellulose derivatives inasmuch as the compounds themselves are polymerizable under the influence of heat; and when used in conjunction with linear polymers such as the cellulose derivatives, they are believed to mechanically interlock the cellulosic polymer chains as well as to polymerize themselves. Thus, they are believed to effect what may be described as a vulcanization of the linear cellulosic polymers. Much support for this theory comes from the fact that the resulting plastics are nonthermoplastic or tend in that direction. Although it has been customary in the use of these compounds to employ a catalyst such as benzoyl peroxide, the polymerization and cross-linking proceeds without a catalyst only at a slower rate. The plastic products, in addition to tending towards being nonthermoplastic, are quite hazy, hard, brittle, and have poor weather resistance.

Now, in the accordance with this invention, it has been found that the above objections to the use of polymerizing plasticizers in cellulose derivative base plastics may be obviated by separately compounding two different molding powders, one based on the use of an organic peroxide catalyst and the other based on the use of a polymerization inhibitor, mixing these two powders, and finally molding the admixed powder in a desired shape. At least 20% inhibitor-bearing molding powder should be employed in the mixture to provide a plastic having the required thermoplasticity.

In the preparation of the inhibitor-containing or inhibited molding powder, the polymerizable plasticizer, cellulose derivative and, as an inhibitor, a small amount of an aromatic compound having at least one OH group or at least one amine group attached directly to the aromatic nucleus are admixed to effect colloidization of the cellulose derivative. Any of the procedures known to the art may be employed, as high pressure mixing in a Banbury mixer, mixing the ingredients with a volatile solvent to form a paste which can be milled on a roll mill, etc. The colloided mass ultimately obtained is broken up into granules of molding powder. In the preparation of catalyst-containing or catalyzed molding powder, similar ingredients are compounded with the exception that an organic peroxide catalyst is used to replace the inhibiting compound.

Having now indicated in a general way the nature and purpose of the invention, reference is made to the accompanying drawing which illustrates one embodiment of the invention wherein the compounding of the two types of molding powders is carried out by the "solvent" process, the molding powder preparation being followed by the steps of intimately and uniformly admixing the two molding powders and subjecting the resulting admixture to molding conditions.

In order to illustrate how the principles of the invention may be employed, the following specific examples are given.

Molding powders were made up on the basis of the following formulations by the "solvent" process. The ingredients shown in Table I were mixed with about 50 parts of ethyl alcohol and about 50 parts of acetone at room temperature where the formula included cellulose acetate of 53.0% acetic acid content, and with 100 parts of acetone where the formula included cellulose acetate of 57.0% acetic acid content. The mixing was carried out in a Baker-Perkins mixer, with 140° F. water running through the jacket, for a period of about 95 minutes. The resulting pastes were then rolled on a two-roll mill, with 180° F. water running through the core, to about 15% solvent content. Upon cooling to room temperature, the resultant sheets were broken up in a rotary cutter to molding powder having a particle size of 1/8 in. to 1/16 in. These granules were heated at 180° F. for 24 hours in a tray drier.

Table I

| Formulation | Conventional | | Catalyzed | | Inhibited | |
|---|---|---|---|---|---|---|
| | 1 | 2 | 3 | 4 | 5 | 6 |
| Cellulose Acetate (53.0% combined acetic acid) | 66 | | 66 | | 66 | |
| Cellulose Acetate (57% combined acetic acid) | | 72 | | 72 | | 72 |
| Diallyl phthalate | | | 34 | 28 | 34 | 28 |
| Dimethyl phthalate | 13 | 10 | | | | |
| Diethylphthalate | 21 | 18 | | | | |
| Benzoylperoxide | | | 0.6 | 0.6 | | |
| Hydroquinone | | | | | 2.0 | 2.0 |

Blends were made by blending the powders of Examples 3 and 5, using 50% by weight of each, and tumbling for a period of about 10 minutes until a uniform mixture was obtained. Similarly, a blend of powders of Examples 4 and 6 was made. The blended powders, also the individual powders of Examples 1 to 4, inclusive, were then molded into standard test shapes. Thus, the molding powders were pelleted into ¾ in. x ⅜ in. diameter cylinders for "flow temperature" specimens, and impact bars were made by injecting plastic composition, prepared by heating the molding powders to a temperature 100–125° F. higher than the "flow temperature" of the plastic composition, into a ½ in. x ½ in. x 5 in. bar mold. Discs for "hardness" and "water absorption" were molded in a positive-type compression mold, using a molding temperature of 320° F. and 1500 lb./sq. in. pressure, and charging enough molding powder to give a disc ¼ in. or ⅛ in. thick as called for by A. S. T. M. specifications. The results of the tests are shown in the following Table II.

be truly thermoplastic. They also have good outdoor weatherability as evidenced by the fact that they have not shown failures of any type after outside exposure for 8 to 11 months at Parlin, N. J.

Additional molding powders were prepared using the following formulations in the same manner as employed for Examples 1 to 6, inclusive.

*Table III*

|  | Examples |  |  |  |  |  |  |  |
|---|---|---|---|---|---|---|---|---|
|  | 7 | 8 | 9 | 10 | 11 | 12 | 13 | 14 |
| Cellulose Acetate (53.0% combined acetic acid) | 66 | 69 |  |  | 66 | 69 |  |  |
| Cellulose Acetate (57.0% combined acetic acid) |  |  | 70 | 72 |  |  | 70 | 72 |
| Diallyl phthalate | 34 | 31 | 30 | 28 | 34 | 31 | 30 | 28 |
| Benzoyl peroxide |  |  |  |  | 0.3 | 0.3 | 0.3 | 0.3 |
| Hydroquinone | 2 | 2 | 2 | 2 |  |  |  |  |

Blends of the powders of Examples 7 and 11, 8 and 12, 9 and 13, and 10 and 14 were prepared

*Table II*

| Properties | 1 | 2 | 3 | 4 | Blend 3–5 | Blend 4–6 |
|---|---|---|---|---|---|---|
| Flow Temperature, °C.[1] | 137 | 150 | 147 | 190 | 151 | 161 |
| Rockwell "M" Hardness | 15 | 31 | 97 | 81 | 29 | 54 |
| Water Absorption 24 hrs., percent [2] | 3.12 | 2.01 | 1.81 | 2.56 | 2.88 | 1.76 |
| Percent Plasticizer Loss [3] | 1.05 | 0.31 | 0.01 | 0.13 | 0.46 | 0.04 |
| Charpy Impact, ft.-lb./in.[3] Notch | 2.8 | 0.7 | 0.3 | 0.3 | 1.5 | 0.9 |
| Deformation under Load [4] 2400 lb./sq. in., percent, hours | 41.3 | 33.8 | 5.7 | 3.4 | 29.6 | 21.5 |
| Dimensional Stability Test: [5] |  |  |  |  |  |  |
| Percent maximum diameter change | −9.5 | −7.5 | −0.5 | −0.4 | −1.0 | −0.8 |
| Percent maximum thickness change | +10.0 | +8.1 | −3.0 | +1.6 | +4.7 | −2.9 |
| Percent maximum weight change | −2.3 | −0.9 | +2.3 | +1.3 | +1.0 | +0.9 |
| Clarity | Clear | Clear | Opaque | Opaque | Slightly mottled | Slightly mottled |

[1] ASTM-D569-41T.
[2] ASTM-D570-40T.
[3] ASTM-D256-41T.
[4] ASTM-D621-41T.
[5] 24 hrs. at −20° F.; 24 hrs. at 170° F.; 24 hrs. at −20° F; 24 hrs. at 170° F. and 65% R. H.

Consideration of the above data indicates that, as compared with the corresponding conventional plastics, the blended plastics have greater heat resistance as shown by the higher flow temperatures. Furthermore, they show distinct improvement over the corresponding conventional plastics both with respect to moisture resistance and retention of plasticizer. The blended plastics are also improved in resistance to deformation and in dimensional stability, as shown by the dimensional stability test.

While the blended plastics are not quite as tough as the conventional plastics as shown by their impact values, they show considerable improvement over the catalyzed plastics in this respect and possess sufficient toughness to be of utility in many diverse commercial applications. The lower hardness values of the blended plastics as compared with the catalyzed is consistent with the data on impact strength. The blended plastics in view of all the data may be said to by tumbling equal parts thereof by weight for about 10 minutes to obtain uniform mixtures. These blended powders, also the unblended catalyzed powders were tested comparatively by molding the powders into various test shapes as explained hereinabove. These shapes were tested in accordance with standard procedures. The results follow:

*Table IV*

| Properties | 11 | 12 | 13 | 14 | Blend 7–11 | Blend 8–12 | Blend 9–13 | Blend 10–14 |
|---|---|---|---|---|---|---|---|---|
| Flow Temperature, ° C | 153 | 161 | 160 | 155 | 143 | 149 | 145 | 147 |
| Rockwell "M" Hardness | 51 | 66 | 50 | 34 | 16 | 27 | 4 | 5 |
| Charpy Impact (ft.-lb./in. Notch) | 1.0 | 0.8 | 0.3 | 0.9 | 4.1 | 1.8 | 0.8 | 1.4 |
| Color | Opaque | Opaque | Opaque | Opaque | Slightly mottled | Slightly mottled | Clear | Clear |
| Water Absorption 24 hrs., percent | 2.41 | 2.58 | 2.24 | 2.40 | 2.94 | 2.57 | 2.58 | 2.20 |

From the above data it will be seen that the blended plastics are far tougher than the corresponding catalyzed samples. The pronounced haziness and brittleness of the catalyzed samples represent serious drawbacks to their utility. By the use of blended powders these defects have been overcome. At the same time it will be noted that the blended plastics approach the catalyzed samples with respect to water resistance.

Cellulose derivatives other than cellulose acetate may be employed in carrying out the invention. Thus, for example, cellulose inorganic acid esters, as cellulose nitrate, etc.; cellulose organic esters, as cellulose acetate propionate, cellulose acetate butyrate, cellulose acetate stearate, cellulose acetate caproate, etc.; and cellulose ethers, as ethyl cellulose, benzyl cellulose, etc., may be employed. The particular derivative employed will be one having a degree of esterification or etherification, as the case may be, within the ranges normally used for the preparation of plastic products. Thus, cellulose acetate, to which this invention has particular application, will, if employed, have an acetic acid content between about 51.0% and 59.0%, preferably between about 57.0% and 58.0%. It is furthermore preferred that the cellulose acetate employed have a chain length corresponding to an intrinsic viscosity of 1.0 or higher, as determined by the method of Kraemer, see Journal of Industrial & Engineering Chemistry, 30, 1200 (1938). All of the cellulose derivatives set forth above are thermoplastic.

The examples have shown the use of diallyl phthalate as a polymerizable plasticizer. However, this compound is merely representative of a class of compounds which may be used for the same purpose. Thus, any organic ester characterized by having at least one ester linkage, said ester containing the polymerizable group

and at least one other polymerizable group containing an olefinic double bond separated therefrom by at least one intervening ester linkage so that the double bonds do not form a conjugated system, may be employed. For example, vinyl or allyl esters of polybasic acids, such as succinic, adipic, phthalic, citric, tartaric, sebacic, etc.; acrylic and alpha-substituted acrylic esters of polyhydric alcohols, such as glycol, glycerol, diethylene glycol, trimethylene glycol, etc.; vinyl or allyl esters of acrylic or crotonic acids, etc., may be employed. Of these various compounds, the allyl esters of polybasic organic acids are preferred, particularly the esters of phthalic, adipic and citric acids. If desired, any of the conventionally employed plasticizers for the particular cellulose derivative being used may be employed in conjunction with the above polymerizable plasticizers in preparing the molding powders to be blended in accordance with the invention, provided they are sufficiently compatible with the other ingredients. In order to achieve the benefits of the use of the polymerizable-type plasticizer, however, the total plasticizer content of each of the molding powders prior to blending should consist of at least 50% by weight of polymerizable-type plasticizer. The total plasticizer content of each of the molding powders prior to blending will desirably be between about 5% and about 40%, preferably between about 15% and about 30%.

As the agent which has been found useful in impeding or inhibiting the polymerization or vulcanizing action of the plasticizers used in accordance with this invention, it has been found that any aromatic compound having at least one hydroxyl group or at least one amine group attached directly to the aromatic nucleus may be employed. Thus, for example, phenols, as phenol, hydroquinone, p-phenyl phenol, catechol, p-menthyl phenol, p-hydroxy phenyl stearate, hydroquinone monobenzyl ether, benzyl catechol, etc.; primary amines, as alpha-naphthylamine, phenyl beta-naphthylamine, etc.; secondary amines, as diphenyl amine, diphenyl hydrazine, diphenyl guanidine, symmetrical dibeta-naphthyl-p-phenylene diamine, etc.; amino-substituted phenols, as p-amino phenol, tyrosine ethyl ester, etc.; may be employed. Of these various compounds, aromatic compounds having not more than 13 carbon atoms have given the best results, with hydroquinone being particularly preferred.

In regard to the amount of such agent to employ in any particular case, it is obvious that varying amounts can be employed to achieve different effects. Thus, it may not be desired to stop the polymerizing or vulcanizing action of the plasticizer entirely in which event a comparatively small amount of the agent will be employed. In general, between about 0.01% and about 5.0% of the agent on the basis of the total of the nonvolatile ingredients of the inhibited molding powder will be employed, the preferred amount being between about 0.3% and about 3.0% of the nonvolatile ingredients of the inhibited molding powder. Of the broad general class of agents which have been found effective in impeding the polymerizing and vulcanizing reactions of the polymerizable plasticizers employed in the compositions of this invention, the agent employed in any particular case may be such as to be soluble in the plastic mass, or it may be present in the plastic mass in finely-divided form uniformly dispersed throughout the plastic mass. It is, furthermore, preferred that the agent be introduced prior to commencement of the colloiding of the particular cellulose derivative employed, i. e., mixed with the cellulose derivative, polymerizable plasticizer, etc., before the mass is milled on a hot roll mill, mixed in a high pressure mixer of the Banbury type, etc.

In preparing the molding powders containing a catalyst for the polymerizing plasticizer, the ingredients and proportions thereof are much the same as those employed in preparing the inhibited powders, the only exception being the replacement of the inhibitor by a catalyst. The catalysts which have proven most effective and productive of uniformity of results, at this point in the process, are the organic peroxides. Specifically, of the class of organic peroxide catalysts, benzoyl peroxide, t-butyl peroxide, lauryl peroxide, acetobenzoyl peroxide, acetyl peroxide, bis(p-chlorobenzoyl) peroxide, bischloroacetyl peroxide, bistriphenylmethyl peroxide, ethyl α-hydroxybenzyl peroxide, and bismethoxymethyl peroxide have proven effective. Benzoyl peroxide is preferred.

In general, the organic peroxide catalyst is employed in the preparation of catalyzed molding powders in somewhat smaller amounts than is the inhibitor in the preparation of inhibitor-containing powders. Between about 0.01% and about 2.0% peroxide catalyst based on the nonvolatile ingredients of the catalyzed molding powder may be employed, between about 0.10% and about 0.65% being preferred.

In carrying out the preceding examples, the colloiding of the cellulose derivative was effected by the "solvent" process in which a volatile solvent for the cellulose derivative and plasticizer was mixed therewith to form a paste and the paste then milled on a hot roll mill to remove most of the volatile solvent and form a homogeneous colloided mass of the cellulose derivative and plasticizer. The invention with which this application is concerned, however, is not limited to carrying out the colloiding and subsequent operations of shaping, granulation to form molding powder, etc., in any particular manner. Any of the processes known to the art may be employed. Thus, colloiding may be effected by high pressure mixing (without the use of volatile solvent) as in a Banbury mixer, by the use of an aqueous slurry of the cellulose derivative to which the plasticizer is added with agitation, and by other common means.

In preparing molding powders as required by the method of this invention, the amount of cellulose derivative or the proportion of cellulose derivative to polymerizable plasticizer employed may be varied considerably depending on the mechanical properties desired in the finished plastics. Furthermore, ingredients in addition to the essential ones may be employed, as for example, resins, gums, fillers, dyes, pigments, etc. The methods of incorporation of these ingredients and the adjustment of formulations to achieve desired properties of the finished products are known to the art.

Both the catalyzed and inhibited powders prepared for use in accordance with the method of the invention should have an average particle size below about 1/16 in., an average particle size between about 1/16 in. and about 1/8 in. being most effective in producing finished blended plastics of optimum structural characteristics. It will be apparent, too, that the more uniform the particle size, the more uniform structural characteristics are obtainable in the finished plastics.

In blending the two types of molding powders, from about 20% to about 90% of the total weight of the blend should be inhibitor-containing molding powder. Furthermore, it is preferred to employ between about 40% and about 60% of inhibitor-containing powder in order to obtain plastics sufficiently tough to have a rather wide range of commercial application. The remainder of the blend is normally catalyzed molding powder. However, if desired, up to 90% of such remainder may be a molding powder based on regular or nonpolymerizing-type plasticizer. The actual blending may be carried out in any suitable device as, for example, a tumbling barrel. The blending operation should be of sufficient duration to assure a uniform mixture.

The impact-enhancing effect of the blended plastics prepared in accordance with this invention appears to be due to the fact that polymerization takes place in the center of the catalyzed granules, polymerization becoming less as the inhibitor in the inhibited granules penetrates into them. The resulting plastic has a slightly mottled appearance, the clearer spots being left by the inhibited granules and the more opaque areas being left by the catalyzed granules. This gives a more or less laminated structure having interspersed zones of polymerized plasticizer-cellulose derivative and inhibited plasticizer-cellulose derivative whereby hardness variations are obtained in an otherwise homogeneous structure. These local differences in hardness from one granule to another have the effect of neutralizing or breaking up molded-in strains in a molded piece so that they cannot distort the material upon exposure to water vapor.

As compared with conventional plastic formulations, i. e., those containing unpolymerizable plasticizers, the plastics prepared in accordance with this invention are more heat-resistant and show substantial improvement both in respect to resistance to moisture and retentivity of plasticizer. These new plastics are more deformation-resistant and more dimensionally stable than the present day plastics having a cellulose derivative base, yet they are very nearly as tough as indicated by their high impact strength. The cold flow tendencies of these new plastics are reduced below those exhibited by the conventional plastics. Pigmented types mold smoothly, have good mold reproduction and appear uniform in structure. These individual characteristics combine to provide excellent outdoor weathering properties.

As compared with plastics formulated on the basis of a polymerizable plasticizer including a polymerization catalyst, the subject plastics are considerably tougher, and while they do not possess the equivalent dimensional stability, they do show an improvement over conventional plastics in this respect.

It will be understood that all parts and percentages herein are by weight unless otherwise mentioned.

What I claim and desire to protect by Letters Patent is:

1. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose derivative of the group consisting of cellulose esters and cellulose ethers and a plasticizer therefor, said plasticizer in each of said catalyzed material and said inhibited material comprising at least 50% by weight of a compound compatible with said cellulose derivative and capable of polymerization per se to a nonthermoplastic material, said compound being an organic ester having at least one ester linkage, said ester containing the polymerizable group $>C=CH_2$ and at least one other polymerizable group containing an olefinic double bond separated therefrom by at least one intervening ester linkage so that the double bonds do not form a conjugated system, said catalyzed material essentially containing about 0.01% to about 2% of an organic peroxide catalyst based on the nonvolatile ingredients in said catalyzed material, said inhibited material essentially containing about 0.01% to about 5% of an inhibitor of the group of phenols, aromatic primary amines, aromatic secondary amines, and amino-substituted phenols based on the nonvolatile ingredients in said inhibited material.

2. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose derivative of the group consisting of cellulose esters and cellulose ethers and a plasticizer therefor, said plasticizer in each of said catalyzed material and said inhibited material comprising at least 50% by weight of an allyl ester of an organic polycarboxylic acid compatible with said cellulose derivative, said catalyzed material essentially containing about 0.01% to about 2% of an organic peroxide catalyst based on the nonvolatile ingredients in said catalyzed material, said inhibited material essentially containing about 0.01% to about 5% of an inhibitor of the group of phenols, aromatic primary amines, aromatic secondary amines, and amino-substituted phenols based on the nonvolatile ingredients in said inhibited material.

3. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose acetate and a plasticizer therefor, said plasticizer in each of said catalyzed material and said inhibited material comprising at least 50% by weight of a compound compatible with said cellulose acetate and capable of polymerization per se to a nonthermoplastic material, said compound being an organic ester having at least one ester linkage, said ester containing the polymerizable group $>C=CH_2$ and at least one other polymerizable group containing an olefinic double bond separated therefrom by at least one intervening ester linkage so that the double bonds do not form a conjugated system, said catalyzed material essentially containing about 0.01% to about 2% of an organic peroxide catalyst based on the nonvolatile ingredients in said catalyzed material, said inhibited material essentially containing about 0.01% to about 5% of an inhibitor of the group of phenols, aromatic primary amines, aromatic secondary amines, and amino-substituted phenols based on the nonvolatile ingredients in said inhibited material.

4. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose derivative of the group consisting of cellulose esters and cellulose ethers and a plasticizer therefor, said plasticizer in each of said catalyzed material and said inhibited material comprising at least 50% by weight of diallyl phthalate, said catalyzed material essentially containing about 0.01% to about 2% of an organic peroxide catalyst based on the nonvolatile ingredients in said catalyzed material, said inhibited material essentially containing about 0.01% to about 5% of an inhibitor of the group of phenols, aromatic primary amines, aromatic secondary amines, and amino-substituted phenols based on the nonvolatile ingredients in said inhibited material.

5. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose derivative of the group consisting of cellulose esters and cellulose ethers and a plasticizer therefor, said plasticizer in each of said catalyzed material and said inhibited material comprising at least 50% by weight of triallyl citrate, said catalyzed material essentially containing about 0.01% to about 2% of an organic peroxide catalyst based on the nonvolatile ingredients in said catalyzed material, said inhibited material essentially containing about 0.01% to about 5% of an inhibitor of the group of phenols, aromatic primary amines, aromatic secondary amines, and amino-substituted phenols based on the nonvolatile ingredients in said inhibited material.

6. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose derivative of the group consisting of cellulose esters and cellulose ethers and a plasticizer therefor, said plasticizer in each of said catalyzed material and said inhibited material comprising at least 50% by weight of diallyl adipate, said catalyzed material essentially containing about 0.01% to about 2% of an organic peroxide catalyst based on the nonvolatile ingredients in said catalyzed material, said inhibited material essentially containing about 0.01% to about 5% of an inhibitor of the group of phenols, aromatic primary amines, aromatic secondary amines, and amino-substituted phenols based on the nonvolatile ingredients in said inhibited material.

7. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose acetate and a plasticizer therefor, said plasticizer in each of said catalyzed material and said inhibited material comprising at least 50% by weight of diallyl phthalate, said catalyzed material essentially containing about 0.01% to about 2% of benzoyl peroxide based on the nonvolatile ingredients in said catalyzed material, said inhibited material essentially containing about 0.01% to about 5% of hydroquinone based on the nonvolatile ingredients in said inhibited material.

8. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose acetate and a plasticizer therefor, said plasticizer in each of said catalyzed material and said inhibited material comprising at least 50% by weight of triallyl citrate, said catalyzed material essentially containing about 0.01% to about 2% of benzoyl peroxide based on the nonvolatile ingredients in said catalyzed material, said inhibited material essentially containing about 0.01% to about 5% of hydroquinone based on the nonvolatile ingredients in said inhibited material.

9. A thermoplastic composition comprising a mixture of granules of a catalyzed molding material and of an inhibited molding material, the granules of both materials having an average granule size less than about 1/16 inch, said inhibited material comprising from about 20% to about 90% of the weight of the thermoplastic composition, the catalyzed material and the inhibited material each comprising a thermoplastic cellulose acetate and a plasticizer therefor, said plasticizer in each of said catalyzed material and said inhibited material comprising at least 50% by weight of diallyl adipate, said catalyzed material essentially containing about 0.01% to about 2% of benzoyl peroxide based on the nonvolatile ingredients in said catalyzed material, said inhibited material essentially containing about 0.01% to about 5% of hydroquinone based on the nonvolatile ingredients in said inhibited material.

10. A thermoplastic composition comprising a molded mass of a mixture of granules of a catalyzed molding material and of an inhibited molding material, the granules of both materials having an average granule size less than about $\frac{1}{16}$ inch, said inhibited material comprising from about 20% to about 90% of the weight of the thermoplastic composition, the catalyzed material and the inhibited material each comprising a thermoplastic cellulose derivative of the group consisting of cellulose esters and cellulose ethers and a plasticizer therefor, said plasticizer in each of said catalyzed material and said inhibited material comprising at least 50% by weight of a compound compatible with said cellulose derivative and capable of polymerization per se to a nonthermoplastic material, said compound being an organic ester having at least one ester linkage, said ester containing the polymerizable group $>C=CH_2$ and at least one other polymerizable group containing an olefinic double bond separated therefrom by at least one intervening ester linkage so that the double bonds do not form a conjugated system, said catalyzed material essentially containing about 0.01% to about 2% of an organic peroxide catalyst based on the nonvolatile ingredients in said catalyzed material, said inhibited material essentially containing about 0.01% to about 5% of an inhibitor of the group of phenols, aromatic primary amines, aromatic secondary amines, and amino-substituted phenols based on the nonvolatile ingredients in said inhibited material.

11. The process of making a thermoplastic cellulose derivative plastic which comprises preparing a first molding powder by admixing a thermoplastic cellulose derivative of the group consisting of cellulose esters and cellulose ethers, a plasticizer therefor, said plasticizer in each of said catalyzed material and said inhibited material comprising at least 50% by weight of a compound compatible with said cellulose derivative and capable of polymerization per se to a nonthermoplastic material, said compound being an organic ester having at least one ester linkage, said ester containing the polymerizable group $>C=CH_2$ and at least one other polymerizable group containing an olefinic double bond separated therefrom by at least one intervening ester linkage so that the double bonds do not form a conjugated system, and about 0.01% to about 5% of an inhibitor of the group of phenols, aromatic primary amines, aromatic secondary amines, and amino-substituted phenols based on the nonvolatile ingredients in said molding powder; colloiding the admixture to form a colloided mass; breaking up the resulting colloided mass into granules of molding powder having an average granule size below about $\frac{1}{16}$ inch; preparing a second molding powder using the same ingredients with the exception that about 0.01% to about 2% of an organic peroxide catalyst is substituted for the aforesaid inhibitor; admixing about 20% to about 90% by weight of the first molding powder with about 80% to about 10% by weight of the second molding powder and subjecting the resulting mixture to molding conditions.

12. The process of making a thermoplastic cellulose derivative plastic which comprises preparing a first molding powder by admixing a thermoplastic cellulose derivative of the group consisting of cellulose esters and cellulose ethers, a plasticizer therefor, said plasticizer in each of said catalyzed material and said inhibited material comprising at least 50% by weight of an allyl ester of an organic polycarboxylic acid compatible with said cellulose derivative, and about 0.01% to about 5% of an inhibitor of the group of phenols, aromatic primary amines, aromatic secondary amines, and amino-substituted phenols based on the nonvolatile ingredients in said molding powder; colloiding the admixture to form a colloided mass; breaking up the resulting colloided mass into granules of molding powder having an average granule size below about $\frac{1}{16}$ inch; preparing a second molding powder using the same ingredients with the exception that about 0.01% to about 2% of an organic peroxide catalyst is substituted for the aforesaid inhibitor; admixing about 20% to about 90% by weight of the first molding powder with about 80% to about 10% by weight of the second molding powder and subjecting the resulting mixture to molding conditions.

13. The process of making a thermoplastic cellulose derivative plastic which comprises preparing a first molding powder by admixing a thermoplastic cellulose acetate, a plasticizer therefor, said plasticizer in each of said catalyzed material and said inhibited material comprising at least 50% by weight of a compound compatible with said cellulose acetate and capable of polymerization per se to a nonthermoplastic material, said compound being an organic ester having at least one ester linkage, said ester containing the polymerizable group $>C=CH_2$ and at least one other polymerizable group containing an olefinic double bond separated therefrom by at least one intervening ester linkage so that the double bonds do not form a conjugated system, and about 0.01% to about 5% of an inhibitor of the group of phenols, aromatic primary amines, aromatic secondary amines, and amino-substituted phenols based on the nonvolatile ingredients in said molding powder; colloiding the admixture to form a colloided mass; breaking up the resulting colloided mass into granules of molding powder having an average granule size below about $\frac{1}{16}$ inch; preparing a second molding powder using the same ingredients with the exception that about 0.01% to about 2% of an organic peroxide catalyst is substituted for the aforesaid inhibitor; admixing about 20% to about 90% by weight of the first molding powder with about 80% to about 10% by weight of the second molding powder and subjecting the resulting mixture to molding conditions.

14. The process of making a thermoplastic cellulose derivative plastic which comprises preparing a first molding powder by admixing a thermoplastic cellulose acetate, a plasticizer therefor, said plasticizer in each of said catalyzed material and said inhibited material comprising at least 50% by weight of an allyl ester of an organic polycarboxylic acid and compatible with said cellulose acetate, about 0.01% to about 5% of hydroquinone on the basis of the total nonvolatile ingredients of the admixture; colloiding the admixture to form a colloided mass; breaking up the resulting colloided mass into granules of molding powder having an average granule size below about 1/4 inch; preparing a second molding powder using the same ingredients with the exception that about 0.01% to about 2% of benzoyl peroxide is substituted for the hydroquinone; admixing about 20% to about 90% by weight of the first molding powder with about 80% to about 10% by weight of the second molding powder and subjecting the resulting mixture to molding conditions.

WALTER E. GLOOR.

REFERENCES CITED

The following references are of record in the file of this patent:

UNITED STATES PATENTS

| Number | Name | Date |
|---|---|---|
| 2,104,760 | Renfrew | Jan. 11, 1938 |
| 2,155,590 | Garvey | Apr. 25, 1939 |
| 2,336,985 | Freund | Dec. 14, 1943 |
| 2,374,081 | Dean | Apr. 17, 1945 |
| 2,379,246 | Muskat | June 26, 1945 |
| 2,420,720 | Pechukas et al. | May 20, 1947 |
| 2,443,736 | Kropa | June 22, 1948 |

FOREIGN PATENTS

| Number | Country | Date |
|---|---|---|
| 540,167 | Great Britain | Oct. 8, 1941 |
| 540,169 | Great Britain | Oct. 8, 1941 |